United States Patent [19]

Craig

[11] Patent Number: 4,957,134

[45] Date of Patent: Sep. 18, 1990

[54] FERTILIZER CONTAINER FOR SPRINKLER SYSTEM

[76] Inventor: James R. Craig, 2925 Cody St., Riverside, Calif. 92503

[21] Appl. No.: 205,062

[22] Filed: Jun. 10, 1988

Related U.S. Application Data

[63] Continuation-in-part of Ser. No. 78,165, Jul. 27, 1987, Pat. No. 4,750,512.

[51] Int. Cl.$^5$ .............................................. B01D 11/02
[52] U.S. Cl. ..................................... 137/268; 422/276
[58] Field of Search ................ 137/268; 422/276, 277, 422/281, 282

*Primary Examiner*—Alan Cohan
*Attorney, Agent, or Firm*—Willie Krawitz

[57] ABSTRACT

A container for solid fertilizer is provided, the container being inserted into a sprinkler line system. The container provides a screen to hold the fertilizer and permits water to permeate therethrough. The screen and fertilizer are secured within a screen holder having continuous or perforated side walls, depending on the type of solid fertilizer to be used, and a gapped bottom support for the screen.

Water from the sprinkler is fed into the container and is pressurized through the screen and dissolves the fertilizer. The rate of solubilization depends on the water flow, the type and solubility of the fertilizer, and the size of the perforations in the screen and gaps in the screen holder.

12 Claims, 4 Drawing Sheets

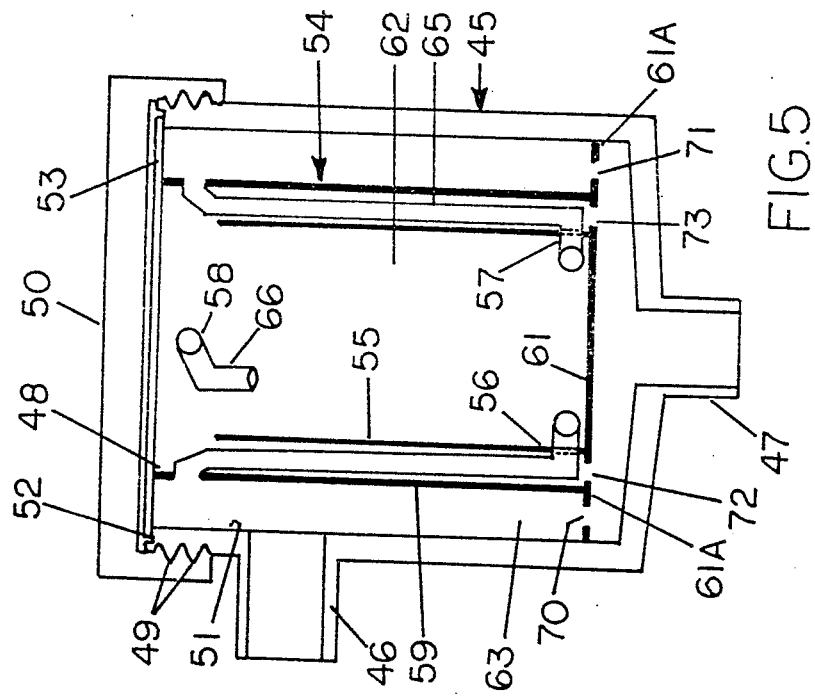
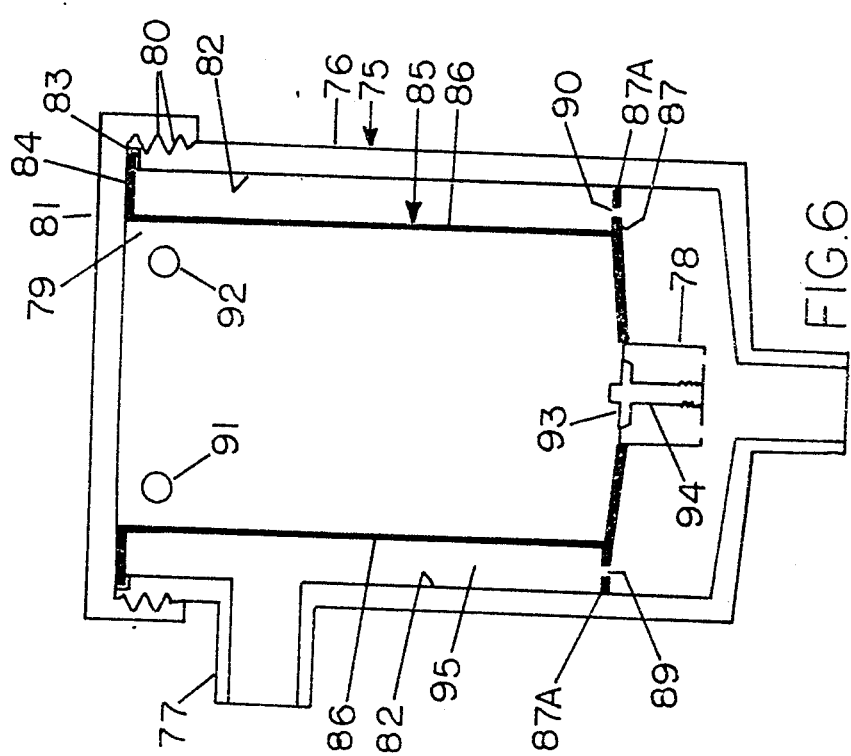

FERTILIZER CONTAINER FOR SPRINKLER SYSTEM

This application is a continuation-in-part of U.S. Ser. No. 78,165 filed Jul. 27, 1987, now U.S. Pat. No. 4,750,512.

BACKGROUND OF THE INVENTION

This invention relates to a new and improved fertilizer applicator for use with sprinkler systems.

Various types of these systems have been disclosed in U.S. Pat. Nos.: 2,994,561; 3,367,353; 3,375,976; 3,669,357; 3,833,177; 4,026,673; 4,456,176; 4,545,396; and 4,635,848.

These devices tend to be cumbersome, complicated, and some require moving parts. Other devices employ meters which are in themselves expensive. Many of these components could be eliminated if the fertilizer applicator system were pre-calibrated in terms of fertilizer solubility, and outlet orifice size.

Also in many instances, it would be desirable to add liquid ingredients to the solid fertilizer when feeding into a sprinkler system. These liquid ingredients could include insecticides, herbicides, and various fertilizers which are relatively expensive such as chelates, hormones, and specialty chemicals.

THE INVENTION

According to the invention, a fertilizer container for a sprinkler system is provided, comprising a screen for containing the fertilizer, and a screen holder for the screen, the screen holder defining continuous side walls and a perforated or slotted side walls, and a perforated or slotted bottom support for the screen. A container or enclosure case for the screen and screen holder is employed, and provides a water inlet, and an outlet for dissolved fertilizer, the outlet connecting into the sprinkler system.

The perforations of the screen and screen holder are sized to permit a water pressure build-up within the enclosure case and force water from the inlet of the enclosure case through the screen to dissolve the fertilizer.

If desired, liquid ingredients such as insecticides, soil penetrants, weedicides, fertilizers, etc., can be added to the solid fertilizer and be absorbed thereby, without dripping through the enclosure case. When water is fed through the fertilizer, the liquids will, of course, be simultaneously removed. This obviates the problem of providing extra equipment for the application of different liquids, besides saving time.

BRIEF DESCRIPTION OF THE DRAWINGS

FIG. 5 is a sectional side elevation view of the device used both for liquid and solid fertilizer; and, FIG. 6 is a sectional side elevation view of the device used both for liquid and solid fertilizer, and employing an outlet valve.

DESCRIPTION OF THE PREFERRED EMBODIMENTS

Figure 1:
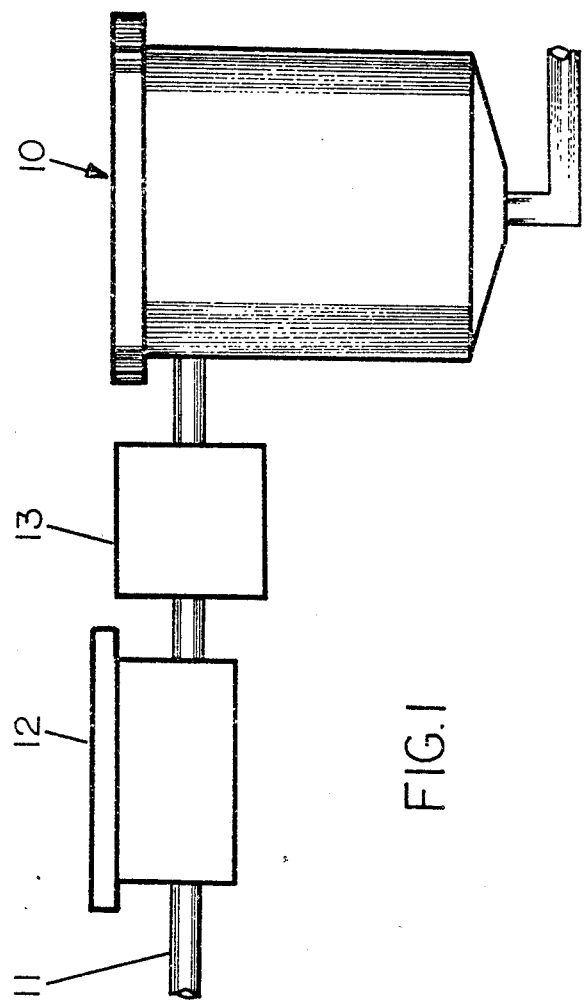
FIG. 1 is a system flow diagram showing the device installed in a water sprinkler system.

The fertilizer device 10 of this invention is shown in diagrammatic form, in FIG. 1 installed in a sprinkler system including conventional components such as a water inlet line 11, an anti-siphon valve 12, and a turn on valve 13 which precedes the device 10.

Figure 2:
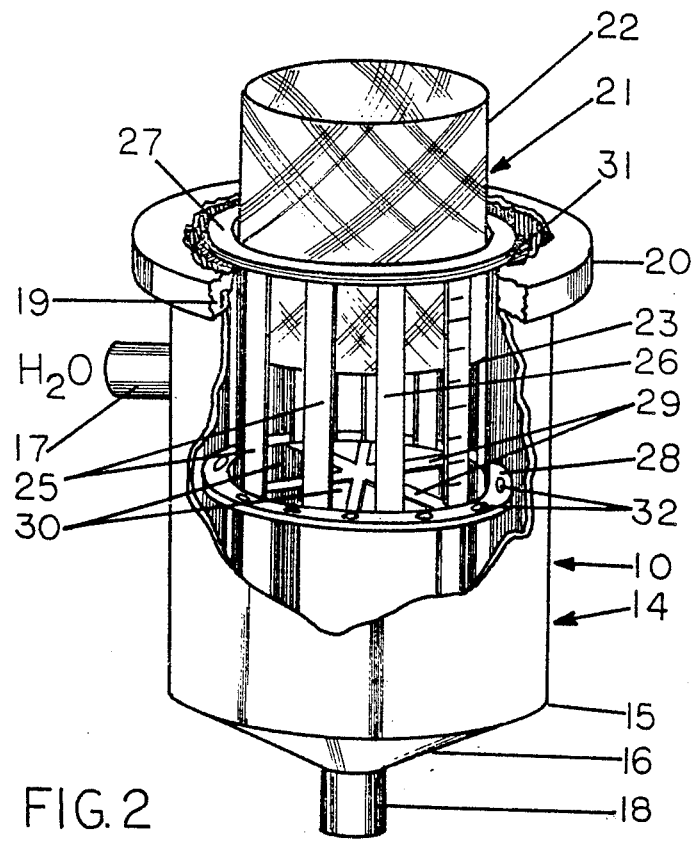
FIG. 2 is an external perspective view, partly exploded, of the device of this invention.

As shown in greater detail in FIG. 2, the device 10 comprises an enclosure case 14 constructed of, say a plastic material such as PVC. The case includes a sidewall portion 15, lower conical bottom 16, water inlet 17, and an outlet 18 for the dissolved fertilizer solution. The upper end of the outer sidewall 15 is threaded 19 to engage a cover plate 20.

A fertilizer screen 21 is shown for containing fertilizer in the form of either solid crystals or granules. The screen may be constructed of fine mesh, stainless steel, teflon fabric, etc., and is configured as a cylinder body 22 and retaining bottom 23. The screen 21 is contained within a screen holder 25, including integrally molded, segmented sidewalls 26 joined at each end with circular end pieces 27 and 28. The bottom of the screen holder provides a plurality of support members 29 havings gaps 30 therebetween. The end piece 27 is threaded 31 to engage the cover plate 20.

A plurality of water orifices 32 are employed to drain water from the wall area of the device when fertilizer is loaded in the screen. When the sprinkler system is being used, but with no fertilizer being present, the drainage effect of these orifices 32 is reduced considerably compared to the gaps 30.

The embodiment shown in FIG. 2 is principally for use with a solid cake of fertilizer, where greater penetration of the cake by water through the sidewalls 26 is necessary. The gaps 30 can be presized to permit a greater or lesser flow of water therethrough. This in turn affects the solubilization rate of the fertilizer cake.

Figure 4:
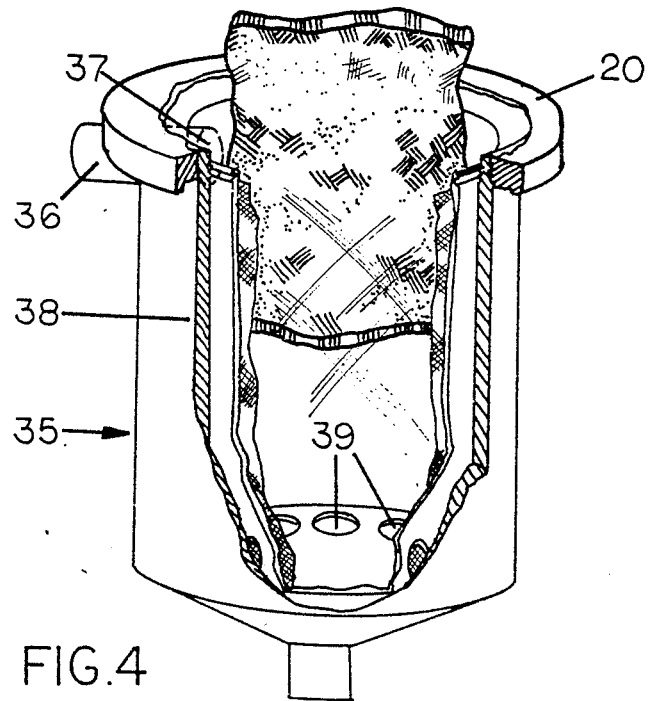
FIG. 4 is a sectional side elevation view of the device used with fertilizer pellets, granules, powder, packaged fertilizer, etc.
Figure 3:
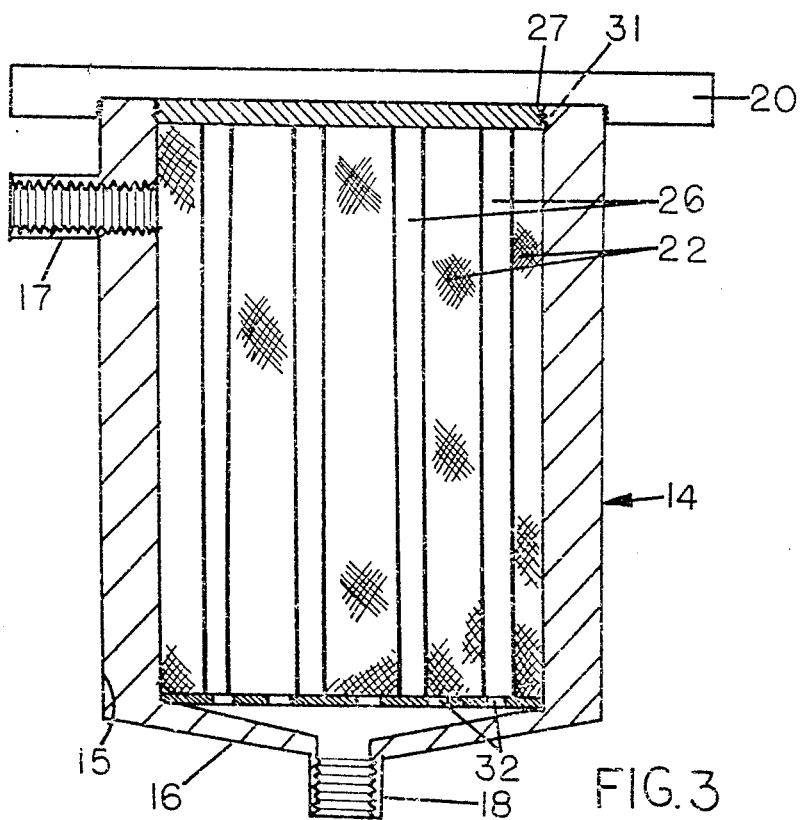
FIG. 3 is a cross sectional view in side elevation of the assembled device.

If pellets are used as the fertilizer, a solid sidewall is preferably used as shown in the device 35 in FIG. 4. In this latter case, the water inlet 36 feeds into a corresponding opening 37 near the upper end of the sidewall 38, and a series of small (e.g. 5/32') outlet orifices 39 are provided for the leached fertilizer solution at the lower portion of the sidewall and bottom.

As shown in FIG. 2, when water is fed into the system, it pressures the interior of the enclosure case 14 and is forced between the segmented sidewalls 26 and through the screen into the fertilizer cake. Dissolved fertilizer passes through the gaps 30 of the support members 29 and the outlet 18.

Also, as noted, liquids such as insecticides, weedicides, fertilizers, etc., can be poured onto, and be absorbed by the solid cake, pellets, powder, etc. Hence, a wider spectrum of materials can be applied, without changing the equipment.

If desired, as shown in FIG. 4, fertilizer in powder, pellet, or crystalline form may be packaged at a factory in a water permeable bag 41 for convenient insertion into the device 35. This avoids the production of dust, fumes or particulates at the user end when working with unpackaged or loose fertilizer. When the fertilizer has been dissolved, the water permeable bag 41 is discarded. If desired, the water permeable bag 31 may be constructed of a water soluble material, to obviate its removal upon use.

FIGS. 5 and 6 illustrate various embodiments of the fertilizer dispenser device used for containing both liquid and solid fertilizer.

In FIG. 5, the device has a removable enclosure case 45 having inlet and outlet portions 46, 47 and a loading opening 48 with outer threads 49 for engaging a closure lid 50. The interior wall 51 of the enclosure case 45 defines an upper shoulder 52 on which rests the rim 53 of a fertilizer holding container 54. Liquid or solid fertilizer may be contained therein, and also a water permeable bag of fertilizer, as described, supra.

The container 54 includes an inner wall 55 with entry ports 56, 57 and 58, and an outer wall 59 spaced from the inner wall 55 to form a mixing chamber 60 therebetween. A bottom 61 is common to both walls 55 and 59, and forms an enclosure 62 for containing fertilizer, and an extension 61a which seals against the inner wall 51 to form the pressure chamber 63. Between the outer wall 59 of the fertilizer container 54 and the inner wall 51 of the enclosure case 45 is defined a pressure chamber 63. The upper end of the fertilizer container is provided with entry tubes 64, 65, 66 which lead into the enclosure 62 through the mixing chamber 60 and respective entry ports 56, 57 and 58. This arrangement improves top-to-bottom mixing.

A plurality of outlet bores, two of which are shown as 70, 71 are formed in the extension 61a. Similarly, outlet bores 72, 73 are formed in the mixing chamber 60. Water from the inlet 46 will fill the pressure chamber 63 and enter the enclosure 62 via the entry tubes 64, 65, 66. A smaller amount of water will drain through the outlet bores 70, 71 to further dilute and mix with dissolved fertilizer. Water in the enclosure 62 will dissolve the fertilizer and will overflow and the further mixed in the mixing chamber 59, and then drain out outlet bores 72, 73. Obviously, as shown in FIG. 6, the dispenser can be simplified by using entry ports, instead of entry tubes, and a spring loaded outlet valve, instead of an overflow arrangement, or overflow without a valve.

The dispenser device 75 shown in FIG. 6 comprises an enclosure case 76 having inlet and outlet ports 77, 78 and an upper, fertilizer loading opening 79 which is threaded 80 to engage a closure top 81. The inner wall 82 of the enclosure case defines a shoulder 83 which supports the flange 84 of a fertilizer container 85. The container defines a sidewall 86 and bottom portion 87 having an extension 87a which seals against the inner wall 82. The extension defines a plurality of outlet bores, two such bores 89, 90 being shown. Water inlets 91, 92 and an outlet port 93 controlled by a valve 94 which is spring biased based on the water pressure inside the container 85.

A pressure chamber 95 is formed between the inner wall 82 of the enclosure case, the sidewall 86, and the extension 87a. Water entering the inlet port 77 will fill the pressure chamber 95 and fill the container 85 through inlets 91, 92. A lesser amount of water will discharge through the outlet bores 89, 90 and will further mix and dilute dissolved fertilizer from the valve controlled outlet port 93.

The system thus enables the use of both liquid and solid fertilizers using the same equipment, and also enables the use of packaged fertilizer with a consequent reduction of dust, and particulate ingestion which can be very dangerous on a long term basis, and this not only applies to fertilizer ingestion, but also to ingestion of insecticides. Moreover, the device of this invention, except for the valve, requires no moving parts.

I claim:

1. A fertilizer applicator for a sprinkler system, comprising:
   A. a screen for holding solid fertilizer, the fertilizer being contained in a water permeable bag;
   B. a screen holder for containing the screen, including:
      i. integrally formed upper and lower end flange members and sidewall elements joined thereto, the said elements providing openings for water to pass therethrough at a controlled rate and dissolve the fertilizer, the lower flange member being perforated to permit water to drain therethrough; and,
      ii. a bottom support member for the screen, the support member having a plurality of sized openings to permit dissolved fertilizer to pass therethrough at a controlled rate;
   C. a case member, including:
      i. a sidewall portion for enclosing the screen holder and contained screen therein;
      ii. the case member being removeably secured to the upper flange member of the screen holder, thereby spacing the sidewall of the case member and the sidewall elements of the screen holder;
      iii. the case member providing inlet and outlet means for water and diluted fertilizer solution, respectively, whereby:
         i. water fed into the inlet will be pressured between the sidewall of the case, through the sidewall elements of the screen holder and into the screen to dissolve the fertilizer;
         ii. water draining from the perforations in the lower flange member will dilute the dissolved fertilizer solution to reduce fertilizer burning; and,
         iii. when the solid fertilizer is dissolved, water is passed principally through openings of the bottom support member and the outlet of the applicator, and then to the sprinkler system.

2. The fertilizer applicator of claim 1, in which the case member provides a top member for engaging the sidewall and for securing the upper flange of the screen holder thereto.

3. The fertilizer applicator of claim 1, in which the solid fertilizer contains a liquid absorbed therein.

4. The fertilizer applicator of claim 3, in which the liquid is selected from the class consisting of: insecticides, fungicides, weedicides, herbicides, plant growth regulants, hormones, soil penetrants and fertilizers.

5. A fertilizer applicator for a sprinkler system, comprising:
   A. a container for holding fertilizer, including:
      integrally formed upper and lower end flange members, a continuous sidewall member and bottom member joined thereto, the said sidewall providing openings for water to pass therethrough at a controlled rate and dissolve the fertilizer, the lower flange member being perforated to permit water to drain therethrough;
   B. an enclosure case for the container, including;
      i. water inlet and outlet means, for water and diluted fertilizer solution, respectively;
      ii. a sidewall portion for enclosing the sidewall of the container;
      iii. the container being removably secured by the upper flange member to the enclosure, thereby spacing the sidewall of the enclosure case and the sidewall of the container; whereby, i. water fed into the inlet will be pressured between the sidewalls and through the openings of the sidewall member to dissolve the fertilizer;

ii. water draining from the perforations in the lower flange member will dilute the dissolved fertilizer solution to reduce fertilizer burning; and, iii. when the solid fertilizer is dissolved, water is passed principally through openings of the lower flange member and the outlet of the applicator, and then to the sprinkler system.

6. The fertilizer applicator of claim 5, including an intermediate sidewall member spaced between the sidewall of the container and the sidewall of the enclosure case, thereby forming an overflow chamber to receive dilute fertilizer solution overflowing from the container, the intermediate sidewall being supported on the lower flange member and permitting draining of dilute fertilizer solution through the perforations thereon.

7. The fertilizer applicator of claim 5, including a drain opening in the bottom member.

8. The fertilizer applicator of claim 7, including valve means disposed in the said drain opening.

9. The fertilizer applicator of claim 5, in which the fertilizer is contained in a water permeable bag.

10. The fertilizer applicator or claim 6, in which the fertilizer is contained in a water permeable bag.

11. The fertilizer applicator of claim 5, in which the solid fertilizer contains a liquid absorbed therein.

12. The fertilizer applicator of claim 11, in which the liquid is selected from the class consisting of: insecticides, fungicides, weedicides, herbicides, plant growth regulants, hormones, soil penetrants and fertilizers.

* * * * *